United States Patent
Schwarzbich

[19]

[11] Patent Number: 5,771,751
[45] Date of Patent: Jun. 30, 1998

[54] TURNBUCKLE FOR A TENSIONING CABLE

[76] Inventor: Jörg Schwarzbich, Wertherstr. 15, D-33615 Bielefeld, Germany

[21] Appl. No.: 728,389

[22] Filed: Oct. 9, 1996

[30] Foreign Application Priority Data

Nov. 18, 1995 [EP] European Pat. Off. .............. 95118171

[51] Int. Cl.$^6$ ...................................................... F16C 1/16
[52] U.S. Cl. ................... 74/502.6; 74/89.15; 74/424.8 R
[58] Field of Search ............................... 74/502.4, 502.6, 74/424.8 R, 89.15, 501.6, 502, 500.5 R; 192/141

[56] References Cited

U.S. PATENT DOCUMENTS

| | | |
|---|---|---|
| 2,944,437 | 7/1960 | Pickles . |
| 4,066,147 | 1/1978 | Toyomoto ........................... 74/502.4 X |
| 4,334,438 | 6/1982 | Mochida ................................ 74/502.4 |
| 4,366,725 | 1/1983 | Kondo .................................... 74/502.4 |
| 4,398,109 | 8/1983 | Kuwako et al. . |
| 5,255,882 | 10/1993 | Schroppel . |

FOREIGN PATENT DOCUMENTS 850 578  12/1939  France .

43 21 985  1/1995  Germany .

*Primary Examiner*—Charles A. Marmor
*Assistant Examiner*—Saúl Rodríguez
*Attorney, Agent, or Firm*—Burns, Doane, Swecker & Mathis, L.L.P.

[57] ABSTRACT

A turnbuckle for a tensioning cable includes a casing forming a cavity. An internally threaded nut is mounted to the casing at one end of the cavity, the nut being rotatably and non-axially movable relative to the casing. An externally threaded bolt is threadedly mounted in the nut and projects into the cavity. The bolt is axially and non-rotatably movable relative to the casing, so that rotation of the nut produces axial movement of the bolt. The casing and bolt have a radial slot formed at adjacent ends thereof, opposite the nut, for attachment to a tensioning cable. The bolt includes a radial cam at each end thereof, each cam having an axially extending first stop for engaging cooperating second stops formed at axial ends of the nut to terminate rotation of the nut when the bolt is at either end of its stroke. The nut includes a recess formed in an end thereof disposed remotely of the casing. One of the cams is movably disposed in the cavity of the casing, and the other cam is movably disposed in the recess of the nut.

14 Claims, 1 Drawing Sheet

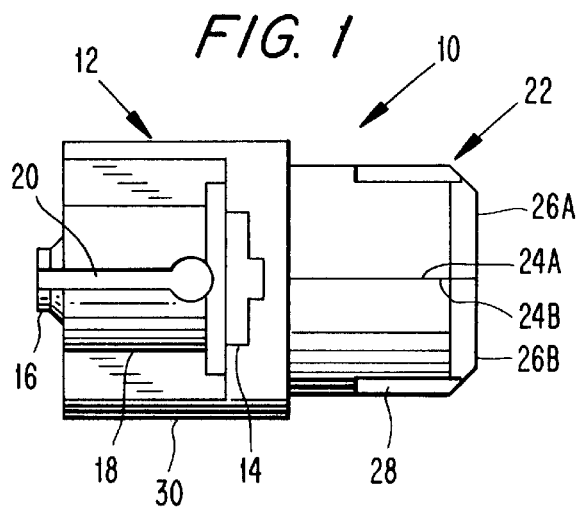
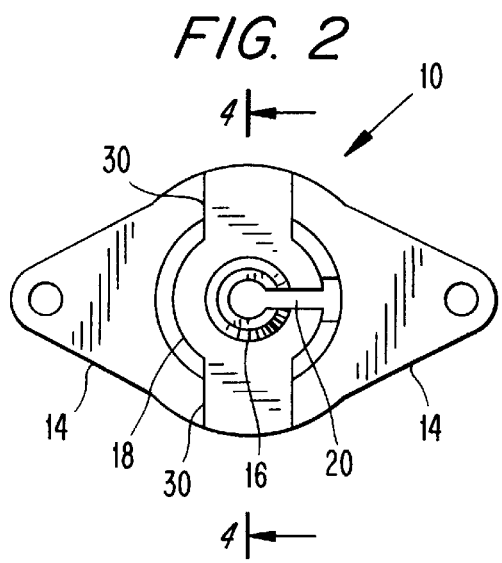
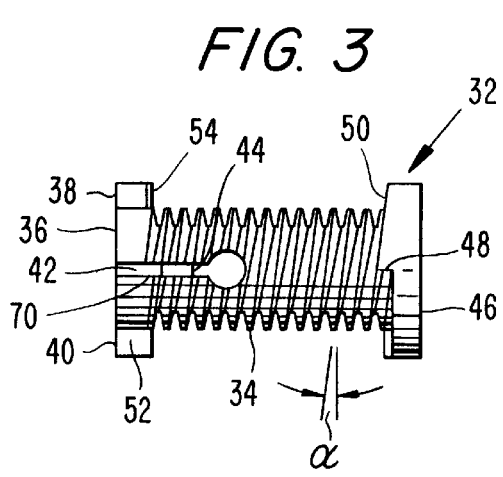
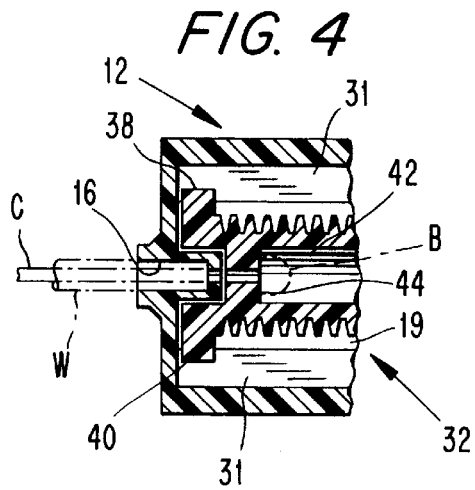
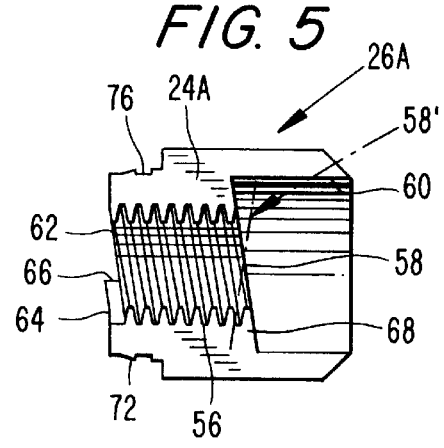
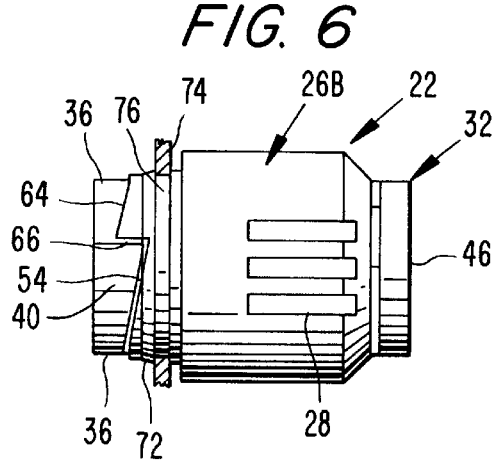

TURNBUCKLE FOR A TENSIONING CABLE

BACKGROUND OF THE INVENTION

This invention concerns a turnbuckle for a tensioning cable wherein two parts are threaded.

Turnbuckles for tensioning cables, such as Bowden control cables, are known which include first and second parts threadedly connected together. The first part is non-rotatable and axially movable; the second part is rotatable and axially non-movable. The cable is attached to the first part.

Such turnbuckles serve to convert a rotating movement to a tensioning movement for a tensioning cable device or cable line or, if necessary, to convert the rotating movement to a translatory motion of the inside cable of a Bowden control cable. One exemplary embodiment for such a turnbuckle is the adjustment of a lordosis support in the back of a vehicle seat with the aid of a Bowden control cable. The turnbuckle serves to activate the Bowden control cable with the aid of a manual wheel or lever attached to the seat.

A known turnbuckle of this kind has an essentially cylindrical casing that must be fastened rigidly to the seat frame, having at one end a receptacle for the outside cable of the Bowden control cable, as well as an opening in the mantle surface, through which the thickened end of the inside cable of the Bowden control cable can be fed in. A threaded portion in the form of a threaded bolt is contained in the casing non-rotating and axially movable and has a recess at one end, which can be aligned with the opening in the casing mantle, so that the inside cable can be hooked into this recess. The threaded bolt engages with the threads of a nut, which is held such that it can rotate and is axially fixed in the casing and has a rotating handle outside of the casing onto which, for example, the manual wheel can be wedged. The threaded bolt can thus be adjusted axially inside the casing by turning the manual wheel so that tension is exerted onto the inside cable of the Bowden control cable.

In order to adjust the lordosis support, the user must exert a certain force on the manual wheel. Once the end of the adjustment range is reached, the user can determine this by the fact that the resistance when turning the manual wheel increases because the nut is tightened on the threaded bolt. This tightening of the nut results in an elastic deformation of the threaded portions involved, so that the nut is braced tightly on the threaded bolt. This has the disadvantage that during a later turning of the manual wheel in the opposite direction, a relatively large initial resistance must be overcome.

For the known turnbuckle, an attempt was made to avoid this disadvantage by not flattening the flute of the threaded bolt at its end, but let it stop abruptly at a front plate and that the complementary threaded profile of the nut also ends at its end in a dull front plate. These front faces in the threaded profiles form a stop at the end of the adjustment range, which directly counteracts the torque exerted on the nut and thus should prevent a tight bracing of the nut. However, because this stop is formed only within the threaded profile and thus the stop faces are very small, the stop cannot stand up to the torque to be expected. This is particularly true if the turnbuckle is manufactured cost-effectively from a plastic material.

It is therefore an object of the invention to create a turnbuckle of the general type described above, for which the rotating threaded portion, after being driven into an end position with given torque, can be turned in the opposite direction once more with little resistance to the release.

SUMMARY OF THE INVENTION

The present invention relates to a turnbuckle for a tensioning cable. The turnbuckle comprises a casing, and first and second threaded members. The casing forms an interior cavity defining a longitudinal axis. The first threaded member extends axially into the cavity and is mounted for axial movement relative to the casing, and is fixed against rotation relative to the casing about the axis. The first threaded member includes a recess for being affixed to a cable. The second threaded member is mounted to the casing for rotation relative thereto about the axis and fixed against axial movement relative thereto. The second threaded member includes a thread connected to a thread of the first threaded member so that rotation of the second threaded member produces axial movement of the first threaded member for tensioning or slackening a cable. The thread of one of the first and second threaded members is an external thread. The one threaded member includes a radial cam formed at least at one axial end thereof. The cam projects radially past the external thread and includes a generally axially facing sloping surface and a circumferentially facing first stop surface extending from an end of the sloping surface. An axial end of the first stop surface is a function of the thread pitch to enable the first stop surface to engage a circumferentially facing second stop surface of the other of the threaded members during relative axial movement between the first and second threaded members, to terminate rotation of the second threaded member.

According to the invention, an outside threaded portion, that is the threaded bolt, has a radially projecting cam at the end of its thread, which forms a stop face that runs parallel to the threaded bolt axis and thus is effective in the circumferential direction. At the other threaded portion, i.e., a nut, a coordinated counter stop is provided for at the respective end of the thread. In the direction of the bolt thread, the cam is limited by a surface that rises at least according to the thread pitch. This ensures that the counter stop can still move unhindered past the cam during the last turn of the thread and does not strike the cam stop face until the end of the last turn of the thread. The stop face can be increased, independent of the lead and profile depth of the thread, by selecting suitable radial dimensions for the cam. In this way, it can be ensured that the torques to be expected in actual operation are absorbed safely, without the threat of damage or destruction to the thread or the stops. Because of the lever action, the permissible limiting torque increases super proportionally if the radial dimensions of the cam are increased, so that even with a slight radial extension of the cam, a considerable increase in the limit torque can be achieved. Of course, the effect of the cam and the counter stop can also be supported by the stops within the thread profile, which are known from prior art.

The invention is not limited to the case where the tensioning cable must be hooked into the threaded bolt. It can also be used with turnbuckles, wherein the tensioning cable is hooked into the nut and the turning handle is attached to the threaded bolt.

Advantageous improvements and embodiments of the invention result from additional features of the invention. For instance, by using a multiple thread and a number of cams that correspond to the number of threads, the available stop face can be multiplied.

The threaded bolt can also be equipped with cams at both ends of its threaded portion, so that the adjustment movement in both directions is limited through stop faces.

With turnbuckles made of plastic, the nut generally comprises of two half shells that can be manufactured as molded plastic parts. In that case, the counter stop face for the cam can be formed simply by the joint face for the nut.

With the initially mentioned, traditional turnbuckles, an extension adjoins the threaded portion of the threaded bolt in axial direction, into which the recess for the tensioning cable is formed. This results on the whole in a relatively long overall axial length, so that it can be difficult to install the turnbuckle in the back-rest bolster in such a way that it does not bother the user. The invention is also faced with the task of reducing the overall length of the turnbuckle.

The invention solves this problem such that for a turnbuckle for a tensioning cable with a casing, having a threaded bolt that is contained non-rotating and axially movable inside the casing and having a nut that is held such that it rotates and is axially fixed inside the casing, the recess for hooking in the tensioning cable is arranged in the threaded portion of the threaded bolt and is open toward the front face side of the threaded bolt. The thickened end of the tensioning cable can be housed completely in the recess, so that the nut can be screwed through the recess. The length of the threaded bolt and thus also the total length of the turnbuckle is reduced considerably by this.

In this case and for a turnbuckle for a Bowden control cable, the seat for the end of the outside wire of the Bowden control cable can be fitted into the front face of the threaded bolt, which will result in a further shortening of the design length. Since, in this case, the outside cable is conducted for a relatively long length inside the casing, a kinking of the Bowden control cable at the end of the outside wire can be avoided, without having to install an additional cable sleeve on the casing. This also results in a simpler design.

BRIEF DESCRIPTION OF THE DRAWING

The objects and advantages of the invention will become apparent from the following detailed description of a preferred embodiment thereof in connection with the accompanying drawing in which like numerals designate like elements, and in which:

FIG. 1 depicts a side view of a turnbuckle according to the present invention;

FIG. 2 shows a frontal view of the turnbuckle, from the left in FIG. 1;

FIG. 3 shows a side view of a threaded bolt of the turnbuckle;

FIG. 4 depicts a partial section taken along line 4—4 in FIG. 2;

FIG. 5 shows a side view of a half shell of a turnbuckle nut; and

FIG. 6 depicts the combination of a threaded bolt and nut in a stop position at one end of the turnbuckle adjustment range wherein a bolt is disposed axially outwardly as far as it can go.

DETAILED DESCRIPTION OF A PREFERRED EMBODIMENT OF THE INVENTION

The turnbuckle 10, which is shown in totality in FIGS. 1 and 2, has a cylindrical casing 12, made of plastic, which is equipped on one end with two radially projecting, diametrically opposed fastening flanges 14. At the opposite end, casing 12 is closed off by a front face, which forms a sleeve 16 for receiving the outside wire W of a Bowden control cable. Circumferential wall 18 of casing 12 has a keyhole-shaped opening 20, which is connected to sleeve 16 and permits a ball-shaped end B of the inside wire C of the Bowden control cable to be fed into the inside cavity 19 of casing 12.

A nut 22 is engaged in the end of casing 12 in such a way that it can be turned inside casing 12, but is held in a defined position in the axial direction (i.e. the longitudinal axis of the cavity). The nut is divided into two identical half shells 26A, 26B, which can be made of molded plastic and joined along respective joint surfaces or interfaces 24A, 24B. Along the circumference of nut 22, wedge-shaped grooves 28 are provided for receiving a manual wheel (not shown) or a comparable turning lever.

Arranged along circumferential wall 18 of casing 12 are two radial protuberances 30, which are diametrically opposed, and which form guide channels 31 inside the casing for the torsional securing and axial guidance of a threaded bolt 32 (FIGS. 3 and 4). Threaded bolt 32 is also made from plastic and has an externally threaded portion 34 with a double outside thread. By "thread" herein is meant an axial screw thread. The bolt 32 is threadedly mounted inside of the nut 22 which is made possible by the fact that the nut is formed of two half shells 26A, B, which can be installed around the bolt 32. At one end, a disk-shaped end piece 36 adjoins the threaded portion 34, for which the outside diameter coincides with the outside diameter of the thread.

Two radially projecting, diametrically opposed cams 38, 40 are formed along the circumferential area of end piece 36 and engage in the above-mentioned guide grooves 31 formed in the protuberances 30. Preferably, the cams 38, 40 and the respectively coordinated guide grooves should have different widths in the circumferential direction, so that the threaded bolt 32 can be fed into casing 12 in one angular position only. In the circumferential area of threaded portion 34, and in both the circumferential area and front face of end piece 36, a keyhole-shaped recess 42 is formed which corresponds in shape to the opening 20 of casing 12. As can be seen in the sectional view in FIG. 4, the recess 42 has a slotted partition wall 44 inside the threaded bolt 32, against which the thickened end of the inside cable can support itself. If nut 22 is turned in a particular direction, threaded bolt 32 moves axially inside casing 12 (i.e. to the right in FIG. 4), so that a pull can be exerted on the inside wire C of the Bowden control cable. Sleeve 16 is extended inside casing 12 and forms an obstruction for the outside wire W of the Bowden control cable. If the threaded bolt is in the position shown in FIG. 4, then this obstruction is disposed inside recess 42 and directly in front of the partition wall 44.

In accordance with FIG. 3, the threaded bolt 32 has a disk-shaped cam 46 on the end that is opposite to its end piece 36. This cam has a larger outside diameter than threaded portion 34 and thus projects radially past the thread. At the end of threaded portion 34, this cam forms two circumferentially facing stop faces 48 that are oriented parallel to the threaded bolt axis and are located diametrically on opposite sides. In the axial direction of the threaded bolt 32, the length of these stop faces 48 corresponds approximately to half the pitch of the dual thread. In the direction of threaded portion 34, cam 46 is limited by two screw-shaped faces 50 that run corresponding to the thread pitch and helix angle a. Each of the cams 38, 40 of end piece 36 forms a stop face 52 that runs in the axial direction. The cams 38, 40 are limited in the direction of threaded portion 34 by screw-shaped faces 54 that run corresponding to the thread pitch. Stop faces 48 and 52, disposed at the opposite ends of the threaded bolt, face in opposite circumferential directions, respectively.

As can be seen most clearly with the aid of half shell 26A, shown in FIG. 5, nut 22 has an internally threaded portion 56 with an inside thread that corresponds to the outside thread of the threaded bolt. An axial recess 60 adjoins this threaded portion at one end, via a collar or end wall 58 that corresponds to the thread pitch and helix angle $\alpha$. Cam 46 of threaded bolt 32 can engage in this recess 60. Threaded portion 56 is limited at the opposite end by two collars 62, 64, that correspond to the thread pitch, and which are spaced from each other by one thread convolution, thereby forming a circumferentially facing counter stop face 66 for stop face 52 of cam 40.

If, as shown in FIG. 6, the threaded bolt 32 has been adjusted farthest to the right with respect to nut 22 and casing 12, then a continued turning of nut 22 is prevented, because cams 38, 40 are stopped by the counter stop faces 66 of both half shells. In this way, an undesired over-tightening of the nut at the adjustment range end is reliably prevented. The slanted surfaces 54 of the cams, and the slanted collars 64, 62 of the nut, which correspond to the thread helix angle, ensure that counter stop faces 66 of the nut can still pass cams 38, 40 without a problem, that is 180 degrees, before reaching the final position shown in FIG. 6.

In the opposite end position of threaded bolt 32, a corresponding stopping mechanism is formed by cam 46. Stop faces 48 of the cam 46 strike counter-stop faces 68 (FIG. 5), which are formed by the respective segments of joint surface 24A, 24B of the half-shells. Such striking occurs when the threaded bolt 32 has been adjusted farthest to the left. The portion 68 is able to form a stop surface because the cooperating portion 58' of the end wall of the recess 60 formed by the other half-shell 26B is offset from the portion 58, i.e., it is inclined in an opposite direction therefrom as shown in broken lines in FIG. 5. Thus, the portion 68 of the joint face 24A shown in FIG. 5 remains exposed after the half-shells have been joined and thereby forms a circumferentially facing stop surface. The joint face of the other half-shell 26B forms a stop surface (not shown) similar to 68 but is disposed diametrically opposite thereto.

In the example shown, the positions for stop faces 48 and 52 at opposite ends of the threaded bolt 32 are turned to be at a 90 degree angle to each other.

Additional stop faces are formed in both end positions through the thread courses of threaded nut portion 56, which are cut off dully at joint face 24. These stop faces stop in one end position at a respective counter surface 70 of end piece 36, and in the other end position they stop at a portion of the stop face 48 of cam 46. Thus, despite the compact design for the turnbuckle and despite the fact that it is made of plastic, a high torque can be absorbed without resulting in elastic deformation of the threaded portions in the end positions and without an over-tightening of nut 22.

A cone 72 (visible in FIGS. 5 and 6) is formed to lock the nut 22 in place within casing 12, at the segments of half shells 26 that engage in the casing, near collars 62, 64. The casing includes an annular, radially inwardly projecting flange 74 (see FIG. 6) which is received in an annular groove 76 of the nut 22 after the cone 72 has traveled axially inwardly past the flange 74. During such travel, the large-diameter end of the cone is elastically compressed radially inwardly by the flange 74 and then snaps radially outwardly to secure the nut 22 against axial dislodgment, while permitting the nut 22 to rotate.

Although the present invention has been described in connection with a preferred embodiment thereof, it will be appreciated by those skilled in the art that additions, deletions, modifications, and substitutions that are not specifically described may be made without departing from the spirit and scope of the invention as defined in the appended claims.

What is claimed:

1. A turnbuckle for a tensioning cable device comprising:

a casing forming an interior cavity defining a longitudinal axis;

a first threaded member comprising an externally threaded bolt extending axially into the cavity and being mounted for axial movement relative to the casing, and fixed against rotation relative to the casing about the axis, the first threaded member including a recess extending radially through the external thread for being affixed to a cable;

a second threaded member mounted to the casing for rotation relative thereto about the axis and fixed against axial movement relative thereto, the second threaded member including a thread connected to a thread of the first threaded member so that rotation of the second threaded member produces axial movement of the first threaded member for selectively tensioning or slackening a cable;

the first threaded member including a radial cam formed at least at one axial end thereof, the cam projecting radially past the external thread and including a generally axially facing sloping surface and a circumferentially facing first stop surface extending from an end of the sloping surface, an axial length of the first stop surface being a function of the thread pitch to enable the first stop surface to engage a circumferentially facing second stop surface of the second threaded member during relative axial movement between the first and second threaded members, to terminate rotation of the second threaded member.

2. The turnbuckle according to claim 1 wherein each of the threads is a multiple-threading and the number of the threads of each multiple-threading equals the number of first stop surfaces on the cam, and the number of first stop surfaces being equal to the number of second stop surfaces.

3. The turnbuckle according to claim 1 wherein the thread of the second threaded member is an internal thread, the second threaded member including an axially facing end face having a sloping surface with the same helix angle as the thread, the sloping surface terminating in a generally axially extending step defining the second stop surface.

4. The turnbuckle according to claim 1 wherein the second threaded member comprises a nut having an internal thread, the nut comprising two half-shells joined along first and second axial joint faces of respective half-shells.

5. The turnbuckle according to claim 4 wherein the first threaded member has radial cams at both axial ends thereof, each cam having a first stop surface, the second threaded member having second stop surfaces at opposite ends thereof to engage respective first stop surfaces when the first threaded member is in a respective axial end position with respect to the second threaded member.

6. The turnbuckle according to claim 4 wherein the second stop surface is formed by at least one of the first and second joint faces.

7. The turnbuckle according to claim 6 wherein the first and second joint faces include mutually adjacent walls which are offset relative to one another, whereby an exposed portion of one of the joint faces defines the second stop surface.

8. The turnbuckle according to claim 1 wherein the second threaded member is a nut having an internal thread, the nut including a recess at one end thereof, the internal thread communicating with an axial end wall of the recess, the axial end wall having a helix angle corresponding to that of the internal thread.

9. The turnbuckle according to claim 8 wherein the cam is axially movable within the axial recess.

10. The turnbuckle according to claim 8 wherein the nut projects from one end of the cavity, the recess of the nut being disposed at an end of the nut which is remote from the cavity.

11. The turnbuckle according to claim 1 wherein the first threaded member has radial cams at both axial ends thereof, each cam having a first stop surface, the second threaded member having second stop surfaces at opposite ends thereof to engage respective first stop surfaces when the first threaded member is in a respective axial end position with respect to the second threaded member.

12. The turnbuckle according to claim 11 wherein the second threaded member comprises a nut having an internal thread, the nut projecting from an end of the cavity and including a recess disposed at an end of the nut disposed remote from the cavity, one of the cams of the first threaded member being axially movable within the recess.

13. The turnbuckle according to claim 1 wherein the recess includes a slotted partition disposed intermediate axial ends of the recess, an axial end of the partition including a wall against which an enlarged end of a cable can bear.

14. The turnbuckle according to claim 13 further including a slotted sleeve formed on the casing in axial alignment with the recess, the sleeve forming a chamber for receiving an end of an outside cable portion of a Bowden cable, while an inside cable portion of the Bowden control cable extends into the recess.

* * * * *